J. G. CHERRY.

MILK COOLER.

No. 9,855. Reissued Sept. 6, 1881.

WITNESSES

P. Hall Sweet

Lloyd Keleher

INVENTOR

John G. Cherry.

By Parker & Sweet Jr.,

ATTORNEY

N. PETERS, Photo-Lithographer, Washington, D. C.

UNITED STATES PATENT OFFICE.

JOHN G. CHERRY, OF CEDAR RAPIDS, IOWA.

MILK-COOLER.

SPECIFICATION forming part of Reissued Letters Patent No. 9,855, dated September 6, 1881.

Original No. 219,910, dated September 23, 1879. Application for reissue filed October 25, 1880.

*To all whom it may concern:*

Be it known that I, JOHN G. CHERRY, of Cedar Rapids, in the county of Linn and State of Iowa, have invented certain new and useful Improvements in Milk-Coolers; and I do hereby declare that the following is a full, clear, and exact description of the invention, that will enable others skilled in the art to which it appertains to make and use the same, reference being had to the accompanying drawings, and to the letters of reference marked thereon, which form a part of this specification.

My invention relates to an improved means for raising cream from milk and for driving off the animal heat or vapor contained in the same in the shortest and best possible manner; and the invention consists, essentially, in water-sealing the milk within the vessel containing it by means of a cover of novel construction and submerging such vessel and cover in a tank of water.

It also consists in providing the vessel and cover with a central cooling-tube for cooling the milk from the center, as well as from the outside of the pan; and it further consists in other details of construction and general arrangement of parts, all as will be hereinafter more fully described, and pointed out in the claims.

Figure 1:
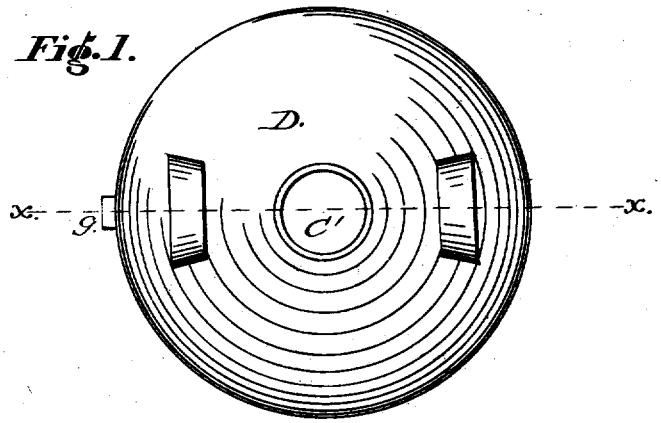
Figure 2:
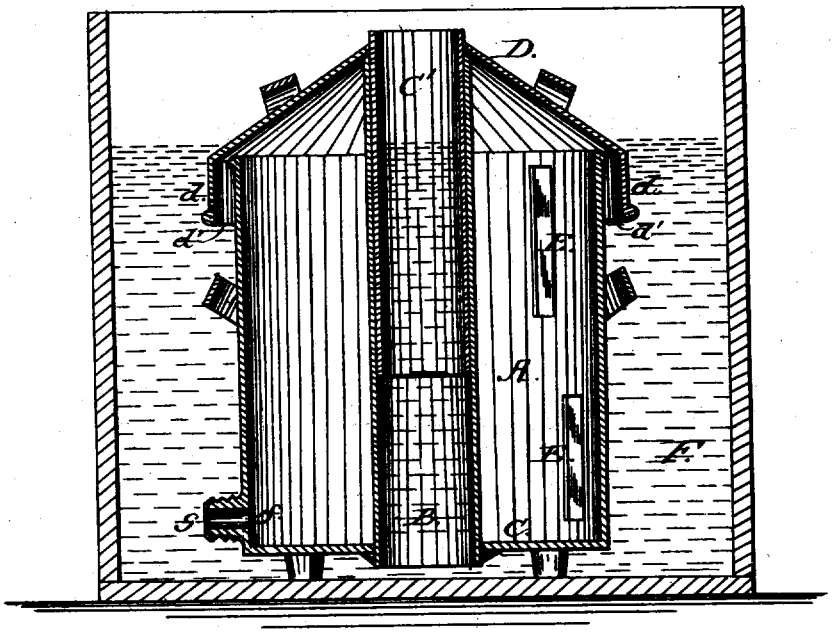

In the accompanying drawings, Figure 1 is a top-plan view of my invention; and Fig. 2, a vertical section of the same, taken on the line *x x* of Fig. 1, and of the vat in which it is intended to be placed.

Similar letters of reference indicate like parts in both figures.

It will be observed that by the old method of raising cream in open shallow pans the milk absorbs deleterious odors and gases and collects dust and dirt floating in the air, and is also subject to the various changes of the atmosphere, rendering a lack of uniformity in the quality and quantity of the cream produced, and consequently lessening the value of the butter made from it.

By means of my present improvements these objections are entirely obviated, inasmuch as the vessel containing the milk is submerged in a tank of water and the milk not only excluded from the outer atmosphere, but an equality in the temperature is established and maintained throughout the entire vessel and the animal heat or vapor driven out into the surrounding water.

Referring to the drawings, A represents the cylindrical milk receptacle or pan, provided with a central tube, B, opening through the bottom C and projecting above the top of the pan, as shown.

D represents the cover, which is conical in shape, and has overlapping sides *d* and central open tube, C′. In the sides of the pan A are arranged graduated glass windows E, for the purpose of permitting the milk or cream to be seen and measured in the can, while at the bottom of said pan is an outlet, *f*, provided with a screw-cap, *g*, the object of which is such that when the cream is raised and it is desired to draw off the milk beneath the same the outlet is opened and the milk drawn off until the lower line of the body of the cream nearly reaches the bottom of the pan, which can be readily observed through the windows E, when the outlet can be temporarily closed, and the cream then drawn off into another vessel, the quantity of the cream being readily determined by the graduated marks on the windows E, thus obviating the necessity of again measuring it. Suitable feet, *i*, are also provided for sustaining the bottom of the pan a short distance above the bottom of the tank, as shown in Fig. 2.

The conical cover D fits loosely over the pan A, leaving an annular space, *d′*, between its overlapping sides *d* and the walls of the pan, the central open tube, C′, fitting within the tube B of the pan A, as fully shown in Fig. 2. The pan thus constructed and arranged is placed in the tank F, and is held in place by a slat or bar running across the tank and over the top of the cover, and the tank then filled with water, so as to submerge the pan and its cover nearly under the water, as shown in Fig. 2.

The annular space *d′* between the overlapping sides *d* and the walls of the pan A forms an air-chamber, preventing the water from rising and flowing over into the interior of the pan, thereby securely water-sealing the same and excluding the contents of the pan from the outside atmosphere. The water rising in the tube B cools the milk from the interior as well as on the sides of the pan, thereby securing an even temperature throughout the same. The animal heat or vapor arising from the milk, being condensed upon the inside surface of the conical cover and trickling down its sides, enters the water in the vat or tank.

It will thus be seen that the cream produced will be entirely pure and free from all deleterious odors consequent upon the retention of the animal heat or vapor in the pan.

The advantages of my invention will be readily apparent without a more minute description, inasmuch as it combines in its construction and operation a high degree of utility and economy with a ready adaptation to the purpose contemplated.

Having thus described my invention, what I claim as new and useful is—

1. In an apparatus for raising cream from milk, the receptacle A, provided with the open central tube, B, in combination with the cover D, having central open tube, C′, adapted to fit within the tube B of the receptacle A, substantially as and for the purpose specified.

2. As an improvement in milk-pans, the milk-receptacle A, provided with the central tube, B, graduated glass windows E, and outlet *f*, in combination with the conical cover D, having overhanging sides *d*, and central tube, C′, substantially as and for the purpose specified.

3. In an apparatus for raising cream from milk, the conical cover D, provided with the open central tube, C′, and downwardly-projecting flange *d*, substantially as and for the purpose specified.

In testimony that I claim the foregoing I have hereunto set my hand this 26th day of August, 1880.

JOHN G. CHERRY.

Witnesses:
MASON P. MILLS,
C. N. JENKINS.